United States Patent [19]

Michels-Krohn et al.

[11] Patent Number: 4,766,596
[45] Date of Patent: Aug. 23, 1988

[54] METHOD AND CIRCUIT ARRANGEMENT FOR THE TRANSMISSION OF DATA SIGNALS BETWEEN CONTROL DEVICES CONNECTED TO ONE ANOTHER VIA A LOOP SYSTEM

[75] Inventors: Karl-Heinz Michels-Krohn, Martinsried, Fed. Rep. of Germany; Josef Untergruber, deceased, late of Nubdorf Inn, Fed. Rep. of Germany, by Angela Untergruber, legal representative

[73] Assignee: Siemens Aktiengesellschaft, Berlin and Munich, Fed. Rep. of Germany

[21] Appl. No.: 900,908

[22] Filed: Aug. 27, 1986

[30] Foreign Application Priority Data

Sep. 11, 1985 [DE] Fed. Rep. of Germany ....... 3532469

[51] Int. Cl.$^4$ .............................................. G06F 11/00
[52] U.S. Cl. .................................. 371/62; 340/825.16
[58] Field of Search ...................... 371/32, 33, 34, 35, 371/62; 370/86; 340/825.05, 825.07, 825.16

[56] References Cited

U.S. PATENT DOCUMENTS

| | | | |
|---|---|---|---|
| 3,754,211 | 8/1973 | Rocher | 371/33 |
| 4,332,027 | 5/1982 | Malcolm | 371/33 X |
| 4,516,121 | 5/1985 | Moriyama | 371/62 X |
| 4,583,089 | 4/1986 | Cope | 340/825.05 |
| 4,646,300 | 2/1987 | Goodman | 371/33 |

FOREIGN PATENT DOCUMENTS 3136524 3/1983 Fed. Rep. of Germany .
3136586 3/1983 Fed. Rep. of Germany .

OTHER PUBLICATIONS

"High Throughput Optical Fiber Loop Network with Effective Detection Mechanism of Lost or Duplicated Token," Yagyu et al., Pathways to the Information Society, Proceedings of the 6th Intl. Conf. on Computer Communications, London, Sep. 7-10, 1982, pp. 496-501.

*Primary Examiner*—Joseph Ruggiero
*Assistant Examiner*—Robert W. Beausoliel
*Attorney, Agent, or Firm*—Hill, Van Santen, Steadman & Simpson

[57] ABSTRACT

A method and apparatus for transmitting data between a number of control devices which are connected to each other by at least one clock-controlled loop, which is operated directionally dependent, are disclosed which cause a transmit authorization signal to be sent via the loop from control device to control device which places each control device, upon receipt thereof, in a transmit authorization status. A control device receiving the transmit authorization signal emits data signals to be transmitted via the loop, with a receiver address identifying a selected other control device intended to receive the data signals, before forwarding the transmit authorization signal to another control device. The control device which transmitted the data signal is then switched to an acknowledgement signal reception status. If the intended other control device receives the data signals correctly, it sends an acknowledgement signal to the transmitting control device. The transmitting control device is maintained in the acknowledgement signal reception status for a time no longer than arrival of a further transmit authorization signal. If the transmitting control device receives the acknowledgement signal within this time, it is then switched to a status enabling renewed emission of further data signals. If no acknowledgement signal is received within this time, the transmitting control device is switched to an error status for either reporting the error or initiating steps to correct the error.

6 Claims, 5 Drawing Sheets

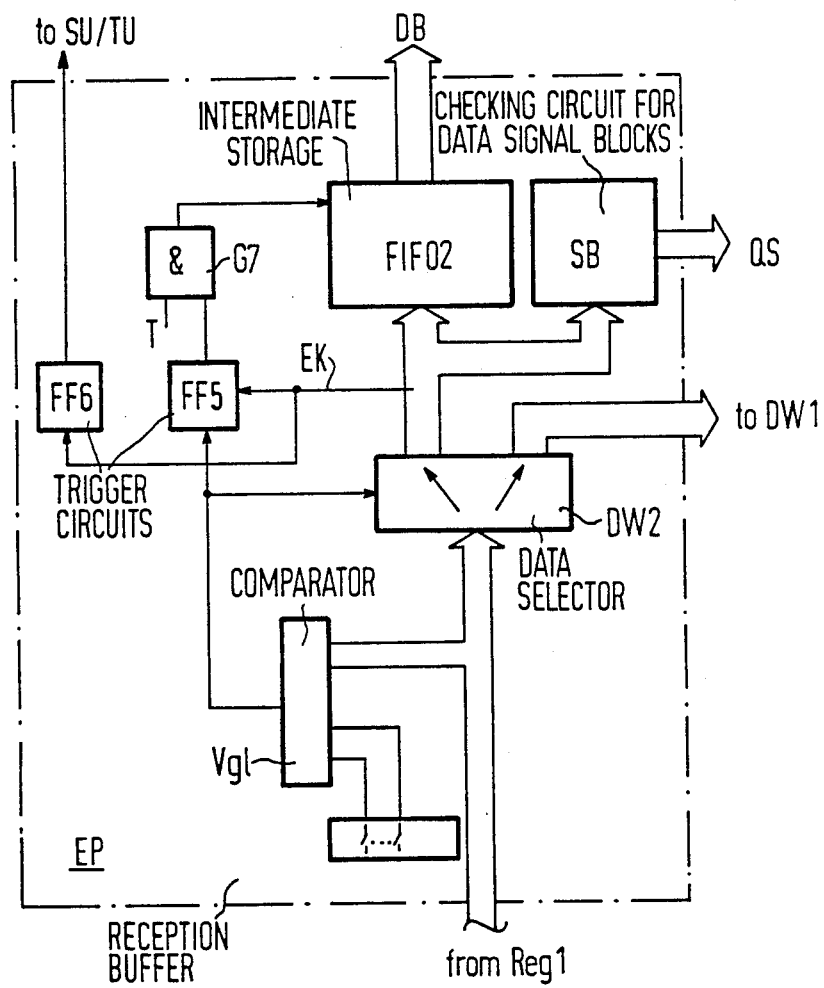

METHOD AND CIRCUIT ARRANGEMENT FOR THE TRANSMISSION OF DATA SIGNALS BETWEEN CONTROL DEVICES CONNECTED TO ONE ANOTHER VIA A LOOP SYSTEM

BACKGROUND OF THE INVENTION

Field of the Invention

The invention relates to a method and to a circuit arrangement for the transmission of data signals between control devices connected to one another via a clock-controlled loop system operated directionally dependent.

RELATED APPLICATIONS

The present application is related to the following applications, all filled simultaneously herewith: Ser. No. 900,900 (Kerschner, Michels-Krohn, Untergruber); Ser. No 900,901 (Kerschner, Michels-Krohn, Untergruber); Ser. No. 900,902 (Michels-Krohn, Untergruber) and Ser. No. 900,904 (Michels-Krohn, Untergruber).

DESCRIPTION OF THE PRIOR ART

Data transmission systems are known wherein the control devices are control devices of a data switching system, whereby a transmit authorization signal respectively driving the control devices into a transmit authorized status is transmitted via the loop system from control device to control device. Data signals to be transmitted by the respective control device are output to the loop system together with a receiver address identifying a desired control device before the transmit authorization signal is forwarded from the respective control device. A control device which is identified by the receiver address transmitted together with the data signals accepts these data signals for further processing and emits an acknowledgement signal to be forwarded via the loop system, the acknowledgement signal being provided for that control means situated in an acknowledgement reception status from which the data signals had been output.

A method of this type is known from German OS No. 31 36 586. In this known method, the control device from which the data signals had been output remains in the acknowledgement reception status until the reception of an acknowledgement signal generated by the control means selected as receiver in response to the acceptance of the data signals. An acknowledgement signal may, however, fail to arrive, due to a faulty functioning of the loop system or a sporadic falsification of the information contained in the acknowledgement signal, so that the control means from which the data signals had been previously output remains in the acknowledgement reception status. This control means is thus inhibited for the further emission of data signals. In order to avoid such an occurrence, it is possible to chronologically limit the acknowledgement reception condition of the control devices. Separate monitoring circuits are required for this purpose in the control devices.

SUMMARY OF THE INVENTION

An object of the present invention is to provide a clock-controlled loop data transmission system wherein an acknowledgement reception status assumed by a control device can be chronologically monitored with a low control outlay.

The above object is achieved in accord with the principles of the invention in that the maximum time span during which a control device is in the acknowledgement reception status after the emission of data signals is defined by the point in time of the renewed arrival of the transmit authorization signal at the control device. Given arrival of the acknowledgement signal for the control device within the maximum time span from another control device, the status enabling a renewed emission of data signals is assumed. Given expiration of the maximum time span before arrival of the acknowledgement signal for the control device, this control device is transferred into an error reporting status and/or an error treating status.

The invention has the advantage that no separate time generator devices are required in a control device for the chronological monitoring of the acknowledgement reception status assumed by a control device but, rather, the appearance of the transmit authorization signal transmitted via the loop system is interpreted for identification of the duration of the existence of an acknowledgement reception status. A further advantage of the invention is that, given the failure of an expected acknowledgement signal to arrive within the maximum prescribed time span, a control device in the acknowledgement reception status is first converted into an error reporting status and/or error treating status. In this way, it is possible to initiate measures for the error recognition within the control device or within the overall loop system in the shortest possible time.

The method disclosed herein can be used in a circuit arrangement having control devices connected to one another via a clock-controlled loop system operated directionally dependent. The control devices may emit data signals to be transmitted to the loop system after reception of a transmit authorization signal as transmission devices and the control devices, as respective reception devices, accept data signals intended for them which are transmitted over the loop system and emit an acknowledgement signal corresponding thereto to the loop system for the transmit device from which the received signals were emitted. In accordance with the principles of the invention each of the control devices comprises a transmit job sequencer which, after the emission of data signals, first transfers the control device into the acknowledgement reception status and, in response to a renewed arrival of a transmit authorization signal before the arrival of the expected acknowledgement signal, transfers the control device out of this acknowledgement reception status into an error reporting status and/or error treating status. An acknowledgement signal receiver is also provided in each of the control devices, the acknowledgement signal receiver emitting an acknowledgement confirmation signal to the appropriate transmit job sequencer in response to the arrival of an acknowledgement signal. This transmit job sequencer, in response to the acknowledgement confirmation signal, transfers the control device now in an acknowledgement reception status into a status enabling a renewed emission of data signals. The advantage of this circuit arrangement is that respectively separate devices, namely a transmit job sequencer and an acknowledgement signal receiver, are provided in the control devices for monitoring the appearance of transmit authorization signals and acknowledgement signals. The control outlay in control devices in an acknowledgement reception status is thus kept low.

The control outlay in the individual control devices can, in particular, be kept low if the transmit job sequencer for the control devices is a microprocessor arrangement provided with a plurality of interrupt control inputs. An arrangement for the reception of transmit authorization signals is connected to a first interrupt control input, the arrangement for the reception of transmit authorization signals, upon appearance of a transmit authorization signal, emitting a control signal corresponding thereto to the appropriate interrupt control input. The aforementioned acknowledgement signal receiver is connected to a further interrupt control input for the emission of an acknowledgement confirmation signal.

The acknowledgement signal receiver can be realized with a relatively low circuit outlay when a decoder means and a register connected to the microprocessor arrangement is provided as the acknowledgement signal receiver. This register, given appearance of an acknowledgement signal intended for the respective control device, accepts the signal for an evaluation by the microprocessor arrangement and, in response to this acceptance, emits an acknowledgement confirmation signal to a control output.

The invention shall be set forth in greater detail below with reference to drawings, by way of example.

DESCRIPTION OF THE DRAWINGS

FIG. 6 shows the structure of a reception buffer arrangement present in the interface circuits.

DESCRIPTION OF THE PREFERRED EMBODIMENTS

Figure 1:
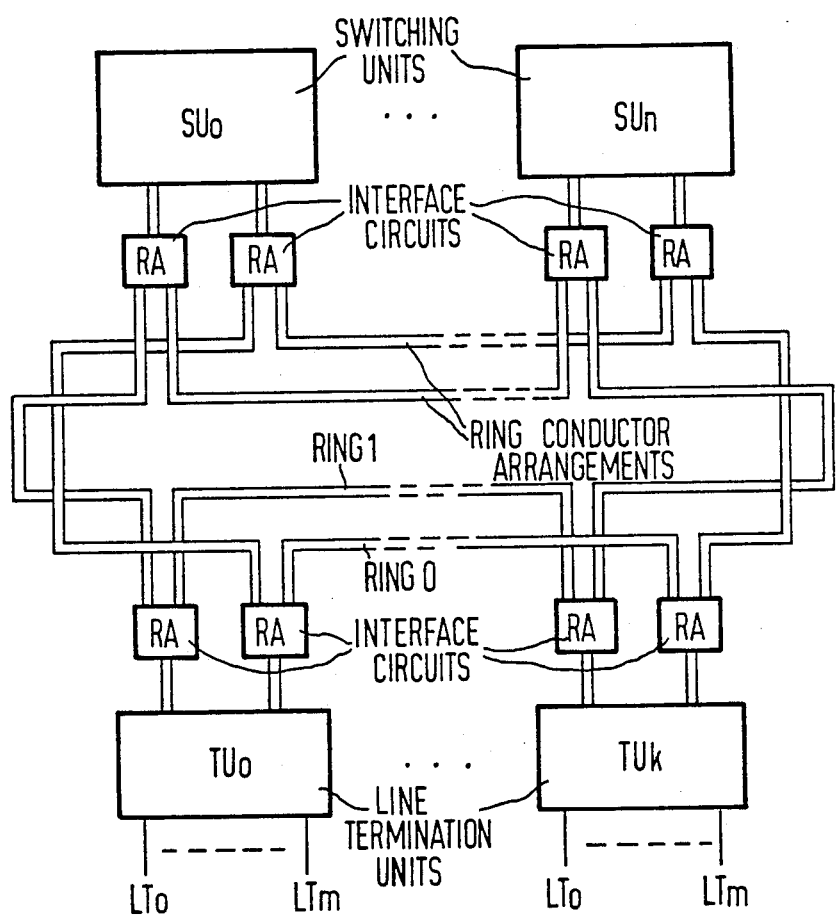
FIG. 1 is a block circuit diagram of a data switching system formed of a loop system in which the invention is used.

FIG. 1 shows a data switching system having a plurality of switching units SUo through SUn. These switching units execute the switching functions required for the transmission of data signals, based on the load division principle. The switching units are connected in common to a loop system for this purpose. Such a loop system can be composed of a single, closed loop conductor arrangement. Such a loop system, however, for example, as shown in FIG. 1, can also be constructed of two ring conductor arrangements RING0 and RING1 proceeding parallel to one another which are independent of one another. Given, for example, an outage of one of the ring conductor arrangements, such a redundancy makes it possible to execute the transmission of data signals on the other ring conductor arrangement.

The connection of the switching units SUo through SUn to the two ring conductor arrangements respectively ensues via a separate interface circuit RA for each of the ring conductor arrangements, this interface circuit RA being discussed in greater detail below.

Line termination units TUo through TUk are also connected to the ring conductor arrangements RING0 and RING1, also respectively connected thereto via a separate interface circuit RA for each of the ring conductor arrangements. Together with the associated interface circuits, these line termination units serve for data signal transmission between the switching units and transmission lines connected to subscriber devices, these transmission lines being connected to the line termination units. For such a connection of transmission lines, each of the line termination units has a plurality of line terminations LTo through LTm.

The circuit units formed by the said switching units or the line termination units and the associated interface circuits shall be referred to below as control devices. If the loop system is composed only of a single ring conductor arrangement, only a single interface circuit belongs to a control device.

Within the switching system shown in FIG. 1, i.e. between the switching units and the line termination units, transmission of data signals ensues in the form of data signal blocks which, as data signals in the course of the set-up of the connection, comprise respective signalling information and, given a set-up connection, comprise the message signals to be communicated between the subscriber equipment coming into consideration. In addition to the actual data signals which are respectively formed of a plurality of bits, for example 8 bits, each data signal block to be transmitted contains at least one receiver address identifying a control device selected as the receiver, start and end identifiers indicating the start and end of a data signal block, a transmitter address identifying the respective control device as the transmitter, and a prepared acknowledgement signal. A data signal block constructed in such fashion can be output to one of the ring conductor arrangements by a control device only when this control device has previously received a transmit authorization signal transmitted from control device to control device which respectively drives each device receiving this signal into a transmit status.

Figure 2:
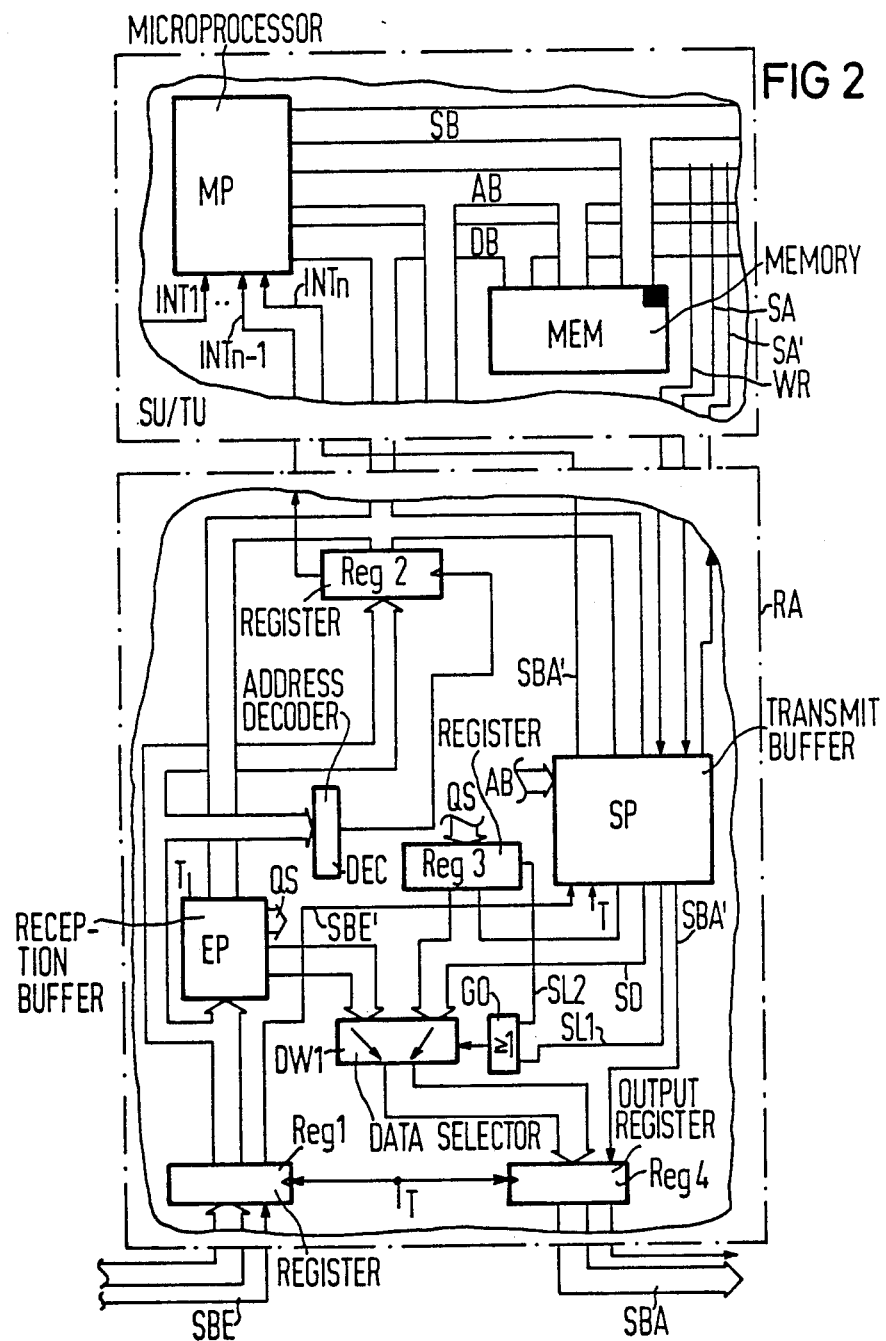
FIG. 2 shows a block circuit diagram of the structure of one of the interface circuits shown schematically in FIG. 1 and of the structure of one of the switching or line termination units.

FIG. 2 shows the structure of a control device in greater detail. As already mentioned above, such a control device is composed either of a switching unit or of a line termination unit indicated in FIG. 2 by the reference SU/TU and of a plurality of interface circuits corresponding in number to the plurality of ring conductor arrangements. Only one of these interface circuits is shown in FIG. 2, since all of the interface circuits connected to the switching units or line termination units internally comprise the same structure.

Each unit (switching unit or line termination unit) referenced SU/TU in FIG. 2 and shown by way of excerpt therein comprises a microprocessor arrangement controlling both transmit as well as receive events. Of this mircoprocessor arrangement, a microprocessor MP and a memory arrangement MEM comprising read-only memories (program memories) and write/read memories, which is connected to said microprocessor MP via a bus system, are shown. The bus system includes a data bus DB and address bus AB and a control bus SB. The interface circuit RA is in communication with the microprocessor MP via the data bus and the address bus as well as via the lines of the control bus referenced WR and SA. Further, two control lines of the interface circuit lead to interrupt inputs INTn-1 and INTn of the microprocessor MP.

The interface circuit RA can be divided into two circuit parts, namely into a transmit part for the emission of data signal blocks to the ring conductor arrangement and a receive part for the acceptance of data signal blocks from the ring conductor arrangement. The receive part shall be discussed first below.

A reception register Reg1 is provided at the interface to the ring conductor arrangement, signals transmitted in parallel form via the ring conductor arrangement being transferred into the reception register Reg1 under the control of a clock generator (not shown) which emits clock pulses T. The clock pulse sequence, moreover, is matched to the transmission rate on the ring conductor arrangement. The signals are a prescribed plurality of data signals and a transmit authorization signal which is transmitted on a separate line referenced SBE. This transmit authorization signal can be formed by a prescribed status of a binary signal which appears for a defined time duration.

The outputs of the input register Reg1 carrying the data signals are connected to a reception buffer arrangement EP and to an acknowledgement signal receiver. The latter is formed of an address decoder DEC and an acknowledgement register Reg2. At their input sides, both are in communication with the outputs of the input register Reg1. The output of the address decoder DEC is connected to a clock input of the acknowledgement register Reg2. This acknowledgement register Reg2 in turn has data signal outputs which are connected to the data bus DB. A control line of the acknowledgement register Reg2 leads to the interrupt input INTn-1 of the microprocessor MP.

As shall be set forth in greater detail below, the reception buffer arrangement EP serves for the acceptance of data signal blocks intended for the respective control device and for the forwarding of data signal blocks intended for other control devices connected to the ring conductor arrangement. At its output side, this reception buffer arrangement is connected to the data bus DB and to first inputs of a data selector DW1, and is also connected via a line arrangement QS to inputs of a register Reg3.

The transmit part of the interface circuit RA includes a transmit buffer arrangement SP which is supplied with signals by the microprocessor arrangement via the data bus DB, the address bus AB and via the lines WR and SA of the control bus SB. Further, an input of the transmit buffer arrangement is connected to that output of the input register Reg1 carrying the transmit authorization signal, being connected thereto via a line referenced SBE'. Finally, the transmit buffer arrangement SP is supplied with the clock signals T at a further input.

The transmit buffer arrangement SP has data signal outputs connected to further inputs of the data selector DW1, connected thereto via a line arrangement SD. Among other things, this data selector is controlled by a control signal appearing on a line referenced SL1, being controlled proceeding from the transmit buffer arrangement. The data selector therefore has a control input connected to the line SL1 via an OR element GO.

The register Reg3 which has its input side connected to the line arrangement QS also has its data signal outputs connected to the inputs of the data selector DW1. A control output of this register is connected to the control input of the data selector DW1, being connected thereto via a line referenced SL2 and via the OR element GO.

At its output side, the data selector DW1 is connected to data signal inputs of an output register Reg4 provided at the interface to the ring conductor arrangement, this output register Reg4 being controlled by the clock pulses T. This register Reg4 has a further input connected to an output of the transmit buffer arrangement SP carrying a transmit authorization signal to be forwarded, being connected thereto via a line referenced SBA'. At its output side, the output register Reg4 is connected to the ring conductor arrangement. The line SBA', moreover, is also connected to the interrupt input INTn of the microprocessor MP. Finally, the transmit buffer arrangement is also in communication with the control bus SB via a line SA'.

It will be understood that the reception buffer arrangement EP and the acknowledgement register Reg2, in addition to being in communication with the data bus DB, are also in communication with the address bus AB and the control bus SB for a drive proceeding from the microprocessor MP. The respective connections, however, are not shown for the purpose of simplifying FIG. 2.

In the following, the interaction of the circuit parts shown in FIG. 2 in the transmission of data signals shall be explained first, before the structures of the reception buffer arrangement EP and of the transmit buffer arrangement SP are discussed in greater detail.

It is first assumed that data signals are to be transmitted from the control device shown in FIG. 2 to another control device. For this purpose, the microprocessor arrangement first compiles the data signals respectively composed of a prescribed plurality of bits to form at least one data signal block. The actual data signals are preceded by a start identifier identifying the start of a data signal block and by a receiver address identifying the control device selected as receiver. Controlled by write pulses transmitted via the line WR, a data signal block compiled in this fashion is subsequently transmitted word-by-word into the transmit buffer arrangement SP. What is to be understood by a word is a prescribed plurality of bits which are simultaneously transmitted to the transmit buffer arrangement in the form of a parallel character. For example, a word can be composed of 16 bits, i.e. of two data signals when each data signal is composed of 8 bits.

After the word-by-word transmission of a data signal block, the microprocessor arrangement then emits a transmit request signal to the transmit buffer arrangement SP via the line SA. Until the appearance of a transmit authorization signal which proceeds to the transmit buffer arrangement SP via the input register Reg1 and the line SBE', the data signal block initially remains unconsidered in the transmit buffer arrangement SP. After the appearance of a transmit authorization signal, however, the data signal block now stored in the transmit buffer arrangement SP is emitted word-by-word to the appropriate ring conductor arrangement via the output register Reg4. An end identifier indicating the end of a data block and a sender address indicating the control device sending the data signal block are thereby also attached to the data signal block, as is an acknowledgement signal prepared for the receiver. Following thereupon, the transmit buffer arrangement SP then forwards the previously received transmit authorization signal via the line SBA' to the output register Reg4 which emits this transmit authorization signal to the ring conductor arrangement.

After the emission of the transmit authorization signal, this being communicated to the microprocessor MP by a signal on the line SA', the control device first transfers into an acknowledgement reception status in which only reception events can be executed and in which the interrupt input INTn of the microprocessor is enabled.

In the normal case, the acknowledgement reception status is maintained up to the arrival of an acknowledgement signal which is emitted by the control device coming into consideration as receiver in response to the reception of a data signal block now transmitted. The acknowledgement signal is the aforementioned, prepared acknowledgement signal transmitted in the data signal block which is modified in the control device coming into consideration as receiver. As a result of this modifying, the transmitter is supplied with information relating to the reception of the transmitted data signal block. For example, the faultless transmission of a data signal block can be indicated by an acknowledgement signal modified in a certain way.

Attached to a modified acknowledgement signal are the address of the sender of the data signal block just received and the end identifier belonging to the data signal block. The address and the end identifier are thereby taken from the received data signal block.

The appearance of an acknowledgement signal is now monitored with the assistance of the aforementioned acknowledgement signal receiver. For this purpose, the address decoder DEC associated therewith constantly compares the signals appearing at the output of the input register Reg1 (FIG. 2) to a signal composed of the address allocated to the control device and of the declared end identifier. When the address decoder thereby identifies coincidence, then it emits a control signal at its output. With the appearance of this control signal, the acknowledgement signal transmitted following upon the address and the end identifier is transferred into the acknowledgement register Reg2.

In response to the acceptance of the acknowledgement signal, the acknowledgement register emits an acknowledgement confirmation signal to the microprocessor MP via its control output. The microprocessor MP subsequently accepts the acknowledgement signal now stored in the acknowledgement register, for a subsequent interpretation. In the course of this interpretation, the microprocessor MP transfers the control device from the acknowledgement reception status into a status in which a renewed emission of a data signal block is possible. Whether a potentially further data signal block pending for a transmission is transmitted or whether measures for error handling such as, for example, measures for renewed transmission of the previously output data signal block, are initiated first given a recognized transmission error depends on the interpretation of the acknowledgement signal. Moreover, the interrupt input INTn is inhibited in this status. The arrival of the transmit authorization signal is constantly monitored in the control device, namely in the appertaining transmit buffer arrangement SP. In response to the appearance of the transmit authorization signal, this emits a control signal to the interrupt input INTn of the microprocessor MP. If the acknowledgement signal expected by a control device now situated in an acknowledgement reception status has not arrived in this control device before the emission of this control signal, then the microprocessor MP transfers the control device into an error reporting status and/or error handling status. In this status, measures for error handling may be initiated in addition to an error report. The consequence of these, for example, is that all devices of the switching system involved in the transmission of the non-acknowledged data signal block, i.e. the two control devices coming into consideration and the ring conductor arrangement used for the transmission are checked step-by-step. When this check thereby shows, for example, that the ring conductor arrangement or the interface circuits RA connected to it do not operate faultlessly, then the error handling can be a switch to the hitherto unused ring conductor arrangement for the transmission of data signal blocks. When, by contrast, central parts of the control devices involved in the transmission do not operate error-free, then the error handling can exclude the control device from a further data signal transmission.

Control events occurring in sequence upon reception of a data signal block in a control device shall now be set forth. As already mentioned above, the reception buffer arrangement EP is provided for the acceptance of data signal blocks. Upon appearance of a start identifier identifying the start of a data signal block, this reception buffer arrangement EP compares the receiver address transmitted at the beginning of the data signal block to an address assigned to the appertaining control device. Given a coincidence of the addresses compared to one another, the signals belonging to the data signal block are accepted into a memory arrangement up to the appearance of an end identifier indicating the end of the data signal block. They initially remain therein until acceptance by the microprocessor arrangement of the unit SU/TU (FIG. 2). The transfer can thereby ensue, for example, in response to a control signal emitted by the reception buffer arrangement given appearance of the end identifier. For this purpose, the control signal can be supplied to the microprocessor MP at a further interrupt input, for example the input INT1.

Before the transfer of a data signal block, a check regarding a faultless transmission in, for example, the form of a parity check is first carried out in the reception buffer arrangement EP. The reception buffer arrangement EP thereby modifies the acknowledgement signal transmitted in the data signal block and prepared by the sender of the data signal block, in accord with the check result, and transmits this modified acknowledgement signal to the register Reg3 together with the address identifying the sender of the data signal block just received and together with the end identifier. The end identifier and address are thereby taken from the received data signal block. The register Reg3 then forwards the accepted signals to the ring conductor arrangement, via the data selector DW1 and the output register Reg4. For this purpose, the data selector DW1 is correspondingly controlled by the register Reg3 via the line SL2.

When, by contrast, the reception buffer arrangement EP identifies a non-coincidence of the addresses compared to one another given the appearance of a start identifier of a data signal block, then this reception buffer arrangement EP forwards this data signal block to the data selector DW1 unmodified. Via this data selector and the following output register Reg4, the data signal block then again arrives onto the ring conductor arrangement and, thus, to the control device following in the ring conductor arrangement.

Figure 3:
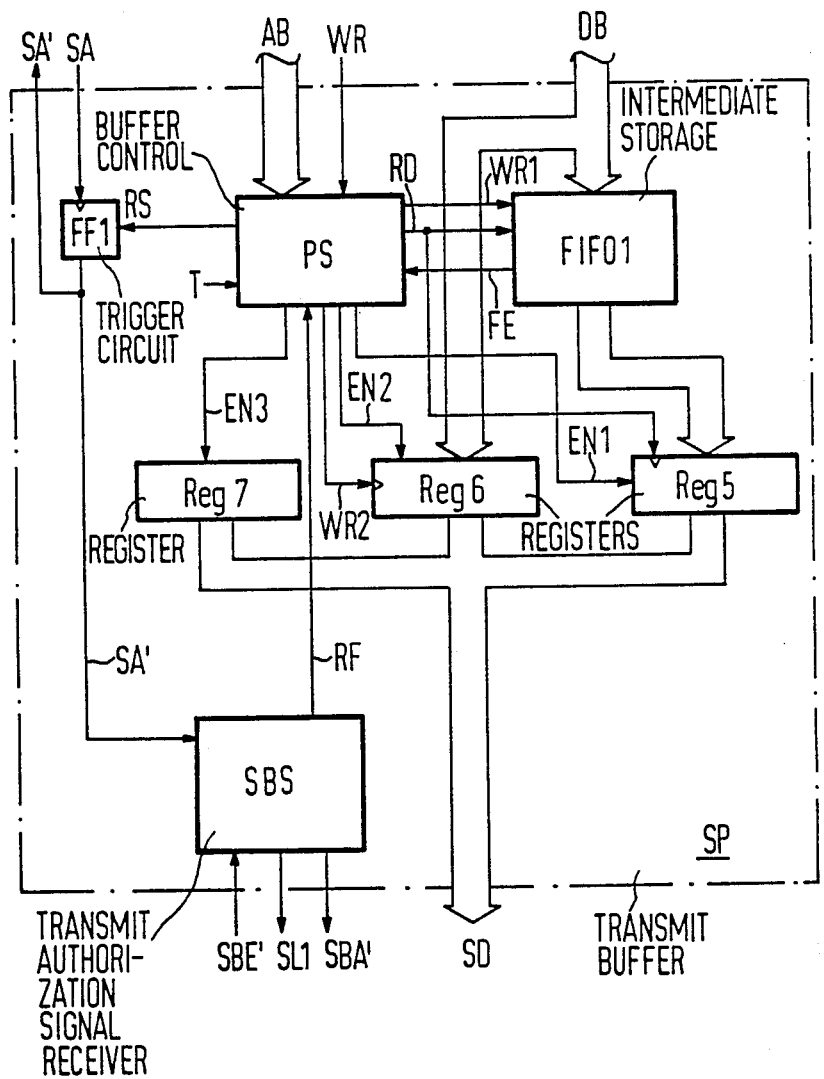
FIG. 3 shows the structure of a transmission buffer arrangement present in the interface circuits.

In the following, the structure of the transmit buffer arrangement SP and of the reception buffer arrangement EP shall also be discussed. FIG. 3 shows a block circuit diagram of the transmit buffer arrangement. Among other things, it includes an intermediate storage FIFO1 which has its data signal inputs connected to the data bus DB. This intermediate storage FIFO1 which is a first-in-first-out memory, serves for the aforementioned word-by-word acceptance of a data signal block offered by the microprocessor arrangement of the unit SU/TU and serves for the forwarding thereof to the ring conductor arrangement in response to the appearance of a transmit authorization signal. The write and read events required for this purpose are controlled from a buffer control means PS shown in FIG. 5 which is connected to the intermediate storage FIFO1 via the lines WR1, RD and FE. The lines WR1 and RD thereby serve for the transmission of write pulses or read pulses. The intermediate storage FIFO1 emits a control signal indicating its empty status via the line FE.

The intermediate storage FIFO1 has its data signal outputs connected to data signal inputs of a register Reg5. This register Reg5, which has its output side connected to the line arrangement referenced SD in FIG. 2, has a clock input connected to the buffer control means PS via line RD and has an input serving for the enable of its data signal outputs connected to the buffer control means PS via the line EN1.

The transmit buffer arrangement SP also includes two further registers Reg6 and Reg7. These registers have their data signal outputs respectively connected to line SD. For enabling these data signal outputs, each register in turn includes a control input which is controllable from the buffer control means PS via a line EN2 or EN3. The register Reg6 thereby serves for readying of the transmitter address and end identifier to be transmitted in a data signal block. These are supplied to the input side of the register Reg6 via the data bus DB. The acceptance of transmitter address and end identifier ensues with the assistance of a write pulse which the buffer control means emits via the line WR2. The prepared acknowledgement signal is stored in the register Reg7.

For the control of the write events in the intermediate storage FIFO1, the buffer control means PS is connected to the address bus AB and to the line WR via which the address signals or write pulses are transmitted.

For the control of read events in the intermediate storage and in the registers Reg5, Reg6 and Reg7, by contrast, the buffer control means is connected to the line T already shown in FIG. 2 for the acceptance of clock pulses and to a line RF. Via the line RF, the buffer control means PS is supplied with an enable signal for the read-out of a data signal block stored in the intermediate storage FIFO1 from a means (shown in greater detail in FIG. 4) for the reception of a transmit authorization signal SBS. This means SBS is connected to the lines SBE', SL1 and SBA' shown in FIG. 2. Via a line SA', moreover, it is connected to the output of a trigger circuit FF1 which is supplied with the aforementioned transmit request signal at its clock input, from the microprocessor MP via the line SA. A reset input of this trigger circuit is connected to the buffer control means PS via the line RS. The line SA' is also connected to the control bus SB.

The following control events occur in sequence in the transmit buffer arrangement SP shown in FIG. 3. For the word-by-word transfer of a data signal block into the intermediate storage FIFO1, write pulses in combination with address signals identifying the intermediate storage are emitted to the buffer control means PS from the microprocessor MP. This buffer control means PS then forwards the write pulses to the intermediate storage FIFO1. A data signal block transferred word-by-word with the assistance of these write pulses initially remains stored in the intermediate storage. After this transfer of the data signal block, finally, the microprocessor MP also emits a transmit request signal via the line SA, this signal switching the trigger circuit FF1 into its active condition.

As a result of this active condition of the trigger circuit FF1, the existence of a data signal block to be transmitted is communicated to the means for the reception of a transmit authorization signal SBS. When this means subsequently receives a transmit authorization signal, it emits a signal corresponding thereto to the buffer control means PS via the line RF. The buffer control means PS, in response thereto, charges the intermediate storage FIFO1 and the register Reg5 with read pulses appearing in the clock grid of the clock pulses T. The buffer control means also emits an enable signal for the data signal outputs of the Reg5. The data signal block now stored in the transit storage FIFO1 is read out word-by-word and is forwarded via the register Reg5 and the data selector DW1 to the ring conductor arrangement. For this purpose, the data selector is correspondingly controlled by the means SBS.

The above read-out then ensues until, in response to read-out of the last data signal belonging to the data signal block, the intermediate storage FIFO1 emits a signal indicating its empty status via the line FE, to the buffer control means PS. This signal proceeding from the buffer control means, then causes data signal outputs of the register Reg5 to be inhibited and, subsequent thereto, the data signal outputs of the register Reg6 are first enabled and, subsequently, the data signal outputs of the register Reg7 are enabled for one clock pulse T. As already set forth above, the transmitter address including the end identifier and the prepared acknowledgement signal are thus also attached to the data signal block just transmitted. After the emission of the acknowledgement signal, the trigger circuit FF1 is reset into its inactive condition by the buffer control means PS. This resetting causes the transmit authorization signal received by the means SBS to be forwarded via the line SBA' to the ring conductor arrangement and a control signal indicating this forwarding is emitted to the microprocessor MP via the line SA'.

Figure 4:
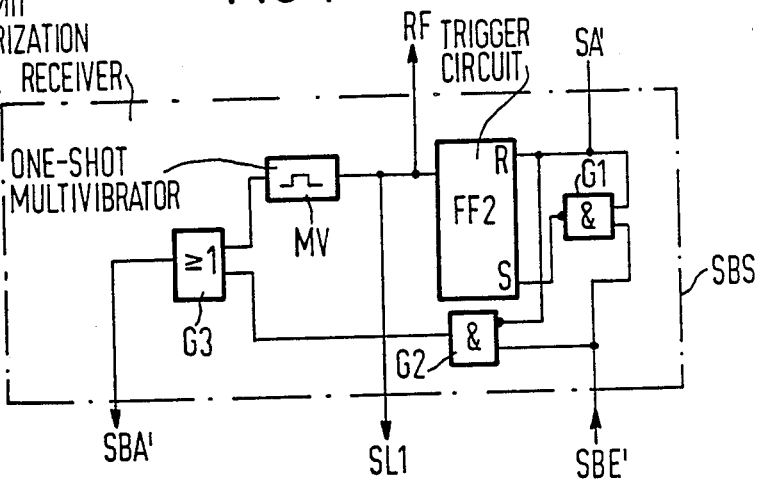
FIG. 4 shows the structure of a device for the reception of a transmit authorization signal.

FIG. 4 shows the structure of the means for the reception of a transmit authorization signal SBS. This includes an RS trigger circuit FF2 whose setting input S is connected to an output of an AND element G1 which negates an output signal. This AND element G1 has one input connected to the line SBE' carrying the transmit authorization signal and has a further input connected to the line SA', the latter also conducted to the reset input of the trigger circuit FF2. Both lines are also connected to inputs of an AND element G2, whereby the input connected to the line SA' negates the input signal supplied to it. At its output side, this AND element G2 is connected to an input of a OR element G3. A further input of this OR element is in communication with the output of a one-shot multivibrator MV which in turn has its input side connected to the output of the RS trigger circuit FF2. The lines SL1 and RF (FIG. 3) are also connected to this output.

The arrangement shown in FIG. 4 always immediately forwards a transmit authorization signal appearing on the line SBE' to the output register Reg4 shown in FIG. 2 via the AND element G2 and the OR element G3 when the trigger circuit FF1 is in its inactive condition, i.e. when the microprocessor MP has not previously output a transmit request signal. When, by contrast, the trigger circuit FF1 is in its active condition, the transmission path is inhibited for the transmit authorization signal. Upon arrival of a transmit authorization signal, the trigger circuit FF2 is switched into its active condition in which the enable signal for the read-out of a data signal block stored in the transit storage FIFO1 appears on the line RF. The control signal is emitted to the data selector DW1 (FIG. 2) via the line SL1 in this condition.

The resetting of the trigger circuit FF1 into its inactive condition after the transmission of a data signal block causes the trigger circuit FF2 to be also switched into its inactive condition. Upon this switching, the one-shot multivibrator MV following the trigger circuit FF2 emits an output signal of a prescribed duration which is forwarded via the OR element G2 as a transmit authorization signal.

Figure 5:
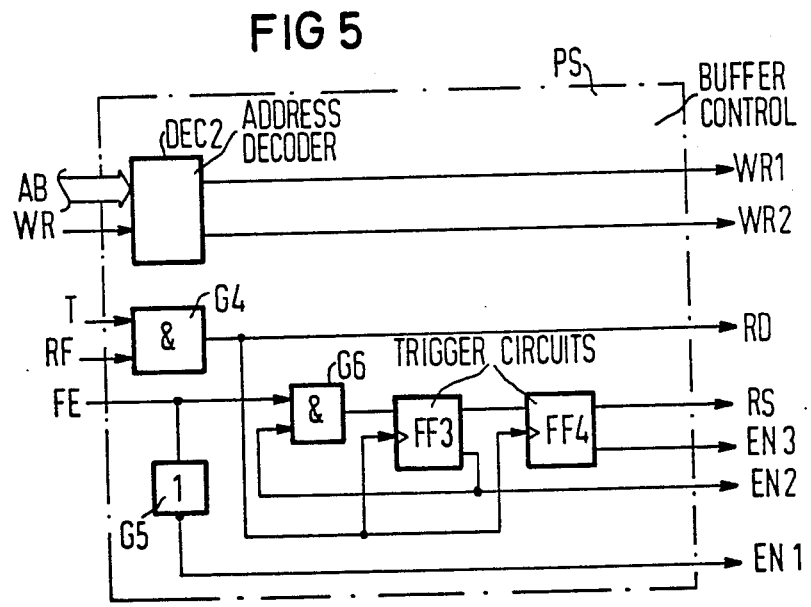
FIG. 5 shows, the structure of a transmit buffer control means.

FIG. 5 shows the structure of the buffer control means PS. The buffer control means PS includes a decoder DEC2 which has its input side connected to the address bus AB and to the line WR. Dependent on the address signals pending on the address bus, the decoder DEC2 forwards the write pulses transmitted on the line WR either to the line WR1 or to the line WR2.

The buffer control means PS also includes an AND element G4 which, given the existence of the enable signal on the line RF, emits clock pulses T to the line RD as read pulses. The output of this AND element G4 is also connected to the clock inputs of two successively connected trigger circuits FF3 and FF4. The non-negating output of the trigger circuit FF3 is directly connected to the data signal input of the trigger circuit FF4. The data signal input of the trigger circuit FF3 is in communication with the output of an AND element G6. At its input side, this AND element is connected to the line FE shown in FIG. 3, and to the output of the trigger circuit FF3 which negates the output signal. The line EN2 is also connected to this output. The trigger circuit FF4 thus has its output which does not negate the output signal connected to the line RS and has its output negating the output signal in communication with the line EN3. Finally, an inverter G5, which has its output side connected to the line EN1, is also connected to the line FE.

The circuit arrangement composed of the AND element G6, the two trigger circuits FF3 and FF4 and the inverter G5 first emits, upon appearance of a signal indicating the empty condition of the transit storage FIFO1, an inhibit signal for inhibiting the data signal outputs of the register Reg5 and subsequently emits respective enable signals for the data signal outputs of the registers Reg6 and Reg7. The trigger circuit FF4 also offers a signal which effects resetting of the trigger circuit FF1.

FIG. 6 shows the structure of the reception buffer arrangement EP. For the address comparison, this arrangement includes a comparator arrangement Vg1 connected to the data signal outputs of the input register Reg1 (FIG. 2). The comparator arrangement Vg1 emits a setting signal to a trigger circuit FF5 given coincidence of the addresses compared to one another. The output side of this trigger circuit FF5 is in communication with an input of an AND element G7. At a further input, this AND element G7 is supplied with the clock pulses T as write pulses. A write pulse input of a memory FIFO2 is connected to the output of this AND element G7. The memory FIFO2 for example, is an intermediate storage which has its data signal outputs connected to the data bus DB. Given the presence of a setting signal, the data signal block is transferred word-by-word into this intermediate storage FIFO2, with the assistance of the clock pulses T transmitted via the AND element G7. The transfer of data signal words thereby ensues until the trigger circuit F5 is reset to its inactive condition by the appearance of an end identifier indicating the end of the data signal block. For this resetting, the trigger circuit FF5 at the input of the intermediate storage FIFO2 is connected to the line EK carrying the end identifier. This line is also connected to a further trigger circuit FF6 which, in response to the appearance of the end identifier, emits the control signal indicating the readiness of a data signal block to the microprocessor MP. The read-out of a data signal block from the intermediate storage FIFO2 need not be discussed in greater detail. This read-out ensues in a known way by supplying corresponding control signals via lines of the control bus SB. The read-out is ended with the appearance of a signal indicating the empty condition of the intermediate storage FIFO2. The microprocessor MP receives this signal supplied from intermediate storage FIFO2, for example in the form of a control signal, via the control bus SB, or as an interrupt signal at an interrupt input.

The input of the intermediate storage FIFO2 is connected to a means SB for checking received data signal blocks. This means SB checks received data signal blocks with respect to their fault-free transmission, for example in the form of a parity check. It thereby modifies the acknowledgement signal contained in a received data signal block which was prepared by the transmitter, in accord with the check result, and it subsequently emits this modified acknowledgement signal to the register Reg3, together with the address identifying the transmitter of the data signal block just received and together with the end identifier.

The intermediate storage FIFO2 is also preceded by a data selector DW2. This data selector DW2 is controlled by the comparator arrangement Vg1. It conducts data signal words belonging to a data signal block to the intermediate storage only when the comparator arrangement Vg1 has identified a coincidence of the addresses compared to one another. Otherwise, the overall, received data signal block is forwarded to the appertaining ring conductor arrangement, via the data selector DW1 shown in FIG. 2 and via the output register Reg4.

In FIGS. 2 and 6, two separate address decoders, namely the address decoder DEC and the comparator arrangement Vg1, are provided for the reception of acknowledgement signals and data signal blocks in the control devices. Instead of these two address decoders, however, a single address decoder can be employed, which, in addition to being supplied with the lines carrying the addresses, is also supplied with lines carrying the start identifier and end identifier, for the recognition of acknowledgement signals and data signal blocks.

Although modifications and changes may be suggested by those skilled in the art it is the intention of the inventor to embody within the patent warranted hereon all changes and modifications as reasonably and properly come within the scope of their contribution to the art.

We claim as our invention:

1. A method for transmitting data between a plurality of control devices connected to each other by at least one clock-controlled loop operated directionally dependent, comprising the steps of:

transmitting successive transmit authorization signals via said loop from control device to control device each transmit authorization signal placing a control device which receives the transmit authorization signal in a transmit authorization status;

a control device receiving said transmit authorization signal emitting data signals to be transmitted via said loop together with a receiver address identifying a selected other control device intended to receive said data signals before forwarding said transmit authorization signal to another control device;

switching a control device which has transmitted said data signals for an intended other control device to an acknowledgement signal reception status;

sending an acknowledgement signal via said loop from said intended other control device, upon receipt of said data signals, to the control device which sent the data signals;

maintaining said control device which has transmitted said data signals in said acknowledgement reception status for a time no longer than the arrival of a successive transmit authorization signal at said control device which has transmitted said data signals;

switching said control device which has transmitted said data signals to a status enabling renewed emission of further data signals if said acknowledgement signal is received within said time; and switching said control device which has transmitted said data signals to an error status if no acknowledgement signal is received within said time.

2. A method as claimed in claim 1, comprising the additional step of:

said control device which has transmitted said data signals generating an error report signal if no acknowledgement signal is received within said time.

3. A method as claimed in claim 1, comprising the additional step of:

said control device which has transmitted said data signals initiating at least one step for the purpose of initiating an error correction routine.

4. A system for transmitting data between a plurality of control devices in said system connected to each other by at least one clock-controlled loop operated directionally dependent, said system comprising:

means in each control device for transmitting successive transmit authorization signals via said loop from control device to control device and means for placing a control device which receives the transmit authorization signal in a transmit authorization status;

means in each control device for emitting data signals to be transmitted via said loop to a selected other control device upon receipt of said transmit authorization signal and before forwarding said transmit authorization signal to another control device, said data signals being transmitted together with a receiver address identifying said selected other control device intended to receive said data signals;

means in each control device for switching a control device which has transmitted said data signals for an intended other control device to an acknowledgement signal reception status;

means in each control device for sending an acknowledgement signal via said loop upon receipt of data signals from another control device to the control device which sent the data signals;

means for maintaining a control device which has transmitted said data signals in said acknowledgement signal reception status for a time no longer than by the arrival of a successive transmit authorization signal at said control device which has transmitted said data signals;

means in each control device for switching a control device which has transmitted said data signals to a status enabling renewed emission of further data signals if said acknowledgement signal is received within said time; and means in each control device for switching a control device which has transmitted data signals to an error status if no acknowledgement signal is received within said time.

5. A system as claimed in claim 4, wherein said means for switching a control device to an acknowledgement signal reception status, said means for sending an acknowledgement signal, said means for maintaining a control device in said acknowledgement signal reception status for a time, said means for switching said control device to a status enabling renewed emission of further data signals, and said means for switching said control device to an error status are combined in a job sequencer comprising:

a microprocessor having a plurality of interrupt control inputs;

means for receiving said transmit authorization signals connnected to a first of said interrupt control inputs and emitting a control signal upon receipt of a transmit authorization signal to said first interrupt control input;

an acknowledgement signal receiver connected to a further interrupt control input of said microprocessor and emitting an acknowledgement confirmation signal thereto upon receipt of an acknowledgement signal.

6. A system as claimed in claim 5, wherein said acknowledgement signal receiver includes a decoder means for operating on the incoming acknowledgement signal and a register connected to said decoder means and to said microprocessor, said register, upon receipt of an acknowledgement signal intended for the control device containing said register, accepting said acknowledgement signal for use by said microprocessor and generating said acknowledgement confirmation signal at a control output thereof.

* * * * *